United States Patent
Ganguly

(10) Patent No.: US 11,192,968 B2
(45) Date of Patent: Dec. 7, 2021

(54) HIGH ETHYLENE RANDOM COPOLYMER WITH NON-MIGRATING OLIGOMERS

(71) Applicant: BRASKEM AMERICA, INC., Philadelphia, PA (US)

(72) Inventor: Ranadip Ganguly, Pittsburgh, PA (US)

(73) Assignee: BRASKEM AMERICA, INC., Philadelphia, PA (US)

(*) Notice: Subject to any disclaimer, the term of this patent is extended or adjusted under 35 U.S.C. 154(b) by 627 days.

(21) Appl. No.: 15/921,191

(22) Filed: Mar. 14, 2018

(65) Prior Publication Data

US 2018/0282448 A1    Oct. 4, 2018

Related U.S. Application Data

(60) Provisional application No. 62/481,388, filed on Apr. 4, 2017, provisional application No. 62/590,906, filed on Nov. 27, 2017.

(51) Int. Cl.
| | | |
|---|---|---|
| *C08F 210/06* | (2006.01) | |
| *B65D 65/38* | (2006.01) | |
| *C08J 5/18* | (2006.01) | |

(52) U.S. Cl.
CPC .......... *C08F 210/06* (2013.01); *B65D 65/38* (2013.01); *C08J 5/18* (2013.01); *C08F 2500/26* (2013.01); *C08F 2800/20* (2013.01); *C08J 2323/14* (2013.01)

(58) Field of Classification Search
CPC .......... C08F 210/06; C08F 2500/26; C08F 2800/20; B65D 65/38; C08J 5/18; C08J 2323/14
USPC ........................................ 524/570
See application file for complete search history.

(56) References Cited

U.S. PATENT DOCUMENTS

| | | | | |
|---|---|---|---|---|
| 3,900,694 | A | * | 8/1975 | Jurrens .................. C09J 123/16 428/513 |
| 5,051,481 | A | | 9/1991 | Taka et al. |
| 5,152,946 | A | | 10/1992 | Gillette |
| 5,800,912 | A | * | 9/1998 | Ogiso .................... B32B 27/32 428/323 |
| 6,946,535 | B2 | | 9/2005 | Tau et al. |
| 8,273,838 | B2 | | 9/2012 | Shan et al. |
| 9,522,968 | B2 | | 12/2016 | Denkwitz et al. |

FOREIGN PATENT DOCUMENTS

| | | | | |
|---|---|---|---|---|
| CN | 102050991 | A | | 5/2011 |
| DE | 4025361 | A1 | * | 2/1992 ........... C08K 5/0041 |
| EP | 2965908 | A1 | | 1/2016 |
| GB | 1145199 | A | * | 3/1969 ................ C09J 7/35 |
| GB | 1259838 | A | * | 1/1972 ............. C23C 18/24 |
| WO | 95/14738 | A1 | | 6/1995 |
| WO | 2006/120190 | A1 | | 11/2006 |
| WO | 2015/169653 | A1 | | 11/2015 |

OTHER PUBLICATIONS

Nekoomanesh et al., "Structural Analysis of Ethylene/Propylene Copolymer Synthesized Using High Activity Bi-supported Ziegler-Natta Catalyst," Iranian Polymer Journal 14: 793-798 (2005).

* cited by examiner

*Primary Examiner* — Kelechi C Egwim
(74) *Attorney, Agent, or Firm* — Jeffrey N. Townes; Cozen O'Connor

(57) ABSTRACT

This invention relates to the use of ethylene/propylene random copolymers for the production of films having low-haze. In particular, the present invention involves the use of ethylene/propylene random copolymer comprising 90-96.5 wt % propylene and 3.5-10 wt % ethylene demonstrated to have low haze. This invention also relates to an ethylene/propylene random copolymer composition comprising about 3.5-10 wt % ethylene content and about 90-96.5 wt % propylene content, for production of a low-haze film.

9 Claims, 1 Drawing Sheet

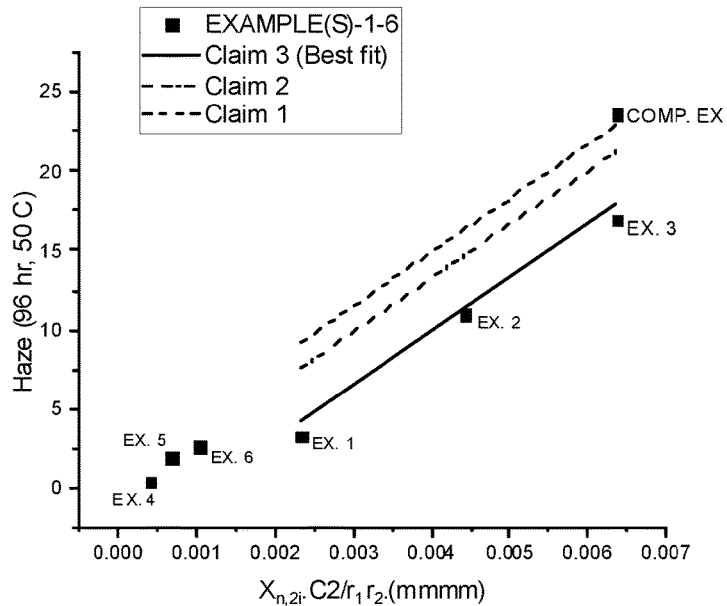
| | | |
|---|---|---|
| Claim 3 | $Haze\ (96\ hr.) \leq 3403.74(\frac{C2.X_{n2i}}{r1r2.(mmmm)}) - 3.68$ | $for\ \frac{C2.X_{n2i}}{r1r2.(mmmm)} \geq 0.00233$ |
| | $\leq 3.3$ | $for\ \frac{C2.X_{n2i}}{r1r2.(mmmm)} \leq 0.00233$ |
| Claim 2 | $Haze\ (96\ hr.) \leq 3403.74(\frac{C2.X_{n2i}}{r1r2.(mmmm)}) - 0.38$ | $for\ \frac{C2.X_{n2i}}{r1r2.(mmmm)} \geq 0.00233$ |
| | $\leq 3.3$ | $for\ \frac{C2.X_{n2i}}{r1r2.(mmmm)} \leq 0.00233$ |
| Claim 1 | $Haze\ (96\ hr.) \leq 3403.74(\frac{C2.X_{n2i}}{r1r2.(mmmm)}) + 1.27$ | $for\ \frac{C2.X_{n2i}}{r1r2.(mmmm)} \geq 0.00233$ |
| | $\leq 3.3$ | $for\ \frac{C2.X_{n2i}}{r1r2.(mmmm)} \leq 0.00233$ |

HIGH ETHYLENE RANDOM COPOLYMER WITH NON-MIGRATING OLIGOMERS

This application claims priority to U.S. Provisional Application No. 62/481,388, filed on Apr. 4, 2017 and to U.S. Provisional Application No. 62/590,906, filed Nov. 27, 2017, both of which are herein incorporated by reference in their entirety.

FIELD OF THE INVENTION

This invention generally relates to the use of ethylene/propylene random copolymers for the production of films having low-haze.

BACKGROUND

Polyolefin polymer compositions have gained wide acceptance and usage in numerous commercial applications because of the relatively low cost of the polymers and the desirable properties they exhibit. Such commercial applications include plastic film, such as cast and oriented films. The plastic film can be used for food and commercial product packaging. It is desirable that the film be transparent in appearance (e.g., have minimal haze) and exhibit no signs of discoloration. For this reason, it is desired to use a polymer composition of high transparency, high gloss and good color in these fields.

High ethylene random copolymers are used in flexible packaging as they show improved optics, excellent heat sealing characteristics such as low sealing initiation temperature (SIT) and high seal strength. Typically, the higher the ethylene content in the propylene/ethylene random copolymer, the greater the improvement in gloss, haze and SIT. However, higher ethylene content also results in unwanted side effects. Examples of unwanted side effects relating high ethylene content random copolymers includes: a higher amount of extractables leading to blooming, die drool, transfer line build up and several other processing disadvantages and restrictions in food and medical packaging applications. An increased propensity of oligomer/additive migration causes visible signs of blooming on the film surface which adversely affects optics and raises regulatory concerns. In EP Patent No. 0730623 B1, which is hereby incorporated by reference, a polymer composition was disclosed which comprises 0.5%-20% of butene-1 and 99.5%-80% of propylene and a synthetic amorphous silica antiblock agent. This polymer composition showed improved blooming behavior, but displayed extremely low migration speed of slip additives. It is possible to achieve the same melting temperature range utilizing ethylene random copolymers, but what distinguishes the propylene butene copolymer is its improved blooming characteristics. Therefore, it is the object of the current invention to combine the improved sealing characteristics of ethylene propylene random copolymers with an improved blooming behavior.

Therefore, there is an unmet need in the art to produce a high ethylene content ethylene/propylene random copolymer devoid of or showing reduced migration/blooming. This invention satisfies that need.

SUMMARY OF THE INVENTION

One aspect of the invention relates to a low-haze film, comprising an ethylene/propylene random copolymer composition comprising about 3.5-10 wt % ethylene content and about 90-96.5 wt % propylene content, wherein the percentage haze of the film, measured on a film of 2 mil thickness after 96 hours of annealing at 50° C., satisfies one of the following two criteria:

i) when the value calculated as $$\frac{C_2 X_{n,2i}}{r_1 r_2 mmmm}$$

is about 0.002 or less, the percentage haze value is no more than about 3.3%; or ii) when the value calculated as $$\frac{C_2 X_{n,2i}}{r_1 r_2 mmmm}$$

is greater than about 0.002, the percentage haze value falls below the linear curve generated from the following equation:

$$\% \text{ Haze} = a\left(\frac{C_2 X_{n,2i}}{r_1 r_2 mmmm}\right) + b,$$

where a is 3403.74 and b is 1.27;

wherein $C_2$ is the ethylene weight percent of the total polymer, $X_{n,2i}$ is the Regio error (or Regio defect) of the hexane extract, $r_1 r_2$ is the Blockiness Index of hexane extract, and mmmm is the Meso-pentad of the hexane extract.

Another aspect of the invention relates to a method for preparing the low-haze film of the invention, comprising:

polymerizing propylene and ethylene with a non-phthalate Ziegler-Natta catalyst system to form the ethylene/propylene random copolymer composition; and extruding the ethylene/propylene random copolymer composition to form the film.

Another aspect of the invention relates to an ethylene/propylene random copolymer composition comprising about 3.5-10 wt % ethylene content and about 90-96.5 wt % propylene content, for production of a low-haze film having a percentage haze, measured on a film of 2 mil thickness after 96 hours of annealing at 50° C., that satisfies one of the following two criteria:

i) when the value calculated as $$\frac{C_2 X_{n,2i}}{r_1 r_2 mmmm}$$

is about 0.002 or less, the percentage haze value is no more than about 3.3%; or ii) when the value calculated as $$\frac{C_2 X_{n,2i}}{r_1 r_2 mmmm}$$

is greater than about 0.002, the percentage haze value falls below the linear curve generated from the following equation:

$$\% \text{ Haze} = a\left(\frac{C_2 X_{n,2i}}{r_1 r_2 mmmm}\right) + b,$$

where a is 3403.74 and b is 1.27;
wherein $C_2$ is the ethylene weight percent of the total polymer, $X_{n,2i}$ is the Regio error of the hexane extract, $r_1 r_2$ is the Blockiness Index of hexane extract, and mmmm is the Meso-pentad of the hexane extract.

BRIEF DESCRIPTION OF THE DRAWINGS

FIG. 1 shows Examples 1-6 and the Comparative Example, all of which are ethylene/propylene random copolymers. The percent haze value of the six ethylene/propylene random copolymers of Examples 1-6 were plotted and were all observed to be no more than 3.3% when the value calculated as $$\frac{C_2 X_{n,2i}}{r_1 r_2 mmmm}$$

was about 0.002 or less or the values fell below the linear curve generated from the following equation:

$$\% \text{ Haze} = a\left(\frac{C_2 X_{n,2i}}{r_1 r_2 mmmm}\right) + b,$$

where a is 3403.74 and b is 1.27 when the value calculated as $$\frac{C_2 X_{n,2i}}{r_1 r_2 mmmm}$$

was greater than about 0.002. The y-axis is the percent haze and the x-axis is the $$\frac{C_2 X_{n,2i}}{r_1 r_2 mmmm}$$

variable.

DETAILED DESCRIPTION OF THE INVENTION

The present invention relates to the use of ethylene/propylene random copolymers for the production of low-haze films. In particular, the present invention involves the use of propylene random copolymer comprising propylene and about 3.5-10 wt % ethylene as a second component. It was surprisingly found that migration/blooming, and consequently lowered haze, can be significantly lowered or eliminated by carefully tailoring the copolymer composition.

One aspect of the invention relates to a low-haze film, comprising an ethylene/propylene random copolymer composition comprising about 3.5-10 wt % ethylene content and about 90-96.5 wt % propylene content, wherein the percentage haze of the film, measured on a film of 2 mil thickness after 96 hours of annealing at 50° C., satisfies one of the following two criteria:

i) when the value calculated as $$\frac{C_2 X_{n,2i}}{r_1 r_2 mmmm}$$

is about 0.002 or less, the percentage haze value is no more than about 3.3%; or
ii) when the value calculated as $$\frac{C_2 X_{n,2i}}{r_1 r_2 mmmm}$$

is greater than about 0.002, the percentage haze value falls below the linear curve generated from the following equation:

$$\% \text{ Haze} = a\left(\frac{C_2 X_{n,2i}}{r_1 r_2 mmmm}\right) + b,$$

where a is 3403.74 and b is 1.27;
wherein $C_2$ is the ethylene weight percent of the total polymer, $X_{n,2i}$ is the Regio error of the hexane extract, $r_1 r_2$ is the Blockiness Index of hexane extract, and mmmm is the Meso-pentad of the hexane extract.

As used herein, regio error (also known as regio defect) refers to 2,1-propylene enchainment. Regio errors are created through the 2,1-insertion (i.e., a misinsertion) of a propylene unit. The misinsertion can either occur after a propylene unit or an ethylene unit. As a result, there is an even number of methylene carbons between neighboring methine carbons. On the other hand, typical 1,2-insertions have an odd number of methylenes between neighboring methine carbons. When the misinsertion occurs after a propylene unit, two methylene carbons appear in a row, giving rise to the $S_{\alpha\beta}$ peaks at around 35.7 ppm and 35 ppm. When the misinsertion occurs after an ethylene unit, four methylenes in a row give rise to the $S_{\beta\gamma}$ peak at around 28 ppm. The regio error is a fraction that is determined by using $^{13}C$ NMR spectroscopy and calculating the total number fraction of even methylene sequences, in accordance with Wang W. et al., *Macromolecules*, Vol. 33, No. 4, 2000, which is incorporated herein by reference in its entirety.

As used herein, blockiness index refers to the product of monomer reactivity ratio ($r_1 r_2$) and provides a measure of the blockiness of ethylene insertion. It is determined using $^{13}C$ NMR spectroscopy in accordance with Kakugo et al., *Macromolecules* 15, 1150-1152, 1982, which is incorporated herein by reference in its entirety.

As used herein, meso-pentad refers to a configuration length of a type of carbon resonance which is used to estimate the stereo-regularity of the polymer chains. It is determined using $^{13}C$ NMR spectroscopy. The higher the mmmm value, the more isotactic the copolymer is. As understood by one skilled in the art, isotactic describes a copolymer having stereo-regular configurations of the methyl group on each asymmetric carbon atom in the copolymer chain.

Two categories of low-haze films fall within this invention. First, when the value calculated as $$\frac{C_2 X_{n,2i}}{r_1 r_2 mmmm}$$

is about 0.002 or less, this invention captures low-haze films having a percentage haze value of no more than about 3.3%. For instance, low-haze films having a percentage haze of no more than about 3.3%, 3.2%, 3.1%, 3.0%, 2.8%, 2.5%, 2.2%, 2%, 1.5%, 1.0%, 0.5%, or 0.1%.

Second, when the value calculated as $$\frac{C_2 X_{n,2i}}{r_1 r_2 mmmm}$$

is greater than about 0.002, this invention also captures low-haze films having a percentage haze value that falls below the linear curve (in relation to the y-axis) generated from the following equation:

$$\% \text{ Haze} = a\left(\frac{C_2 X_{n,2i}}{r_1 r_2 mmmm}\right) + b,$$

where a is 3403.74 and b is 1.27. The b variable in the equation represents the y-intercept and is recited as a positive number in the equation. As the b variable decreases (resulting in a lower y-intercept), less area below the linear curve is available. For instance, the b variable may be −0.38, which shifts the linear curve and corresponds to a lesser area under the curve than when b is 1.27. In another embodiment, the b variable may be −3.68, which further shifts the linear curve and corresponds to a lesser area under the curve than when b is −0.38. Depending on where in the plot the low-haze film falls, it can have a percentage haze value ranging from 4% to 30%. In one example, the percent haze value is less than 30%. For instance, the percent haze value may be less than 30%, 28%, 25%, 22%, 20%, 18%, 15%, 12%, 10%, 9%, 8%, 7%, 6%, 5%, or 4%.

The ethylene/propylene random copolymer composition comprises about 3.5-10 wt % ethylene content, including all integer ranges therebetween. For example, the ethylene content is from about 4 wt % to 10 wt %, from about 5 wt % to 10 wt %, from about 5 wt % to about 7.5 wt %, or from about 5 wt % to about 6 wt %. In one embodiment, the ethylene content is about 5.7 wt %. In another embodiment, the ethylene content is about 3.7 wt %.

The ethylene/propylene random copolymer composition comprises about 90-96.5 wt % propylene content, including all integer ranges therebetween. For example, the propylene content is from about 91 wt % to about 96 wt %, from about 92 wt % to about 95 wt %, or from about 94 wt % to about 95 wt %.

The polymer compounds of the present invention can include any conventional plastics additives in any combination that would not deleteriously affect the slip properties of the compound. The amount should not be wasteful of the additive or detrimental to the processing or performance of the compound. Those skilled in the art of thermoplastics compounding, with reference to such treatises as Plastics Additives Database (2004) from Plastics Design Library (www.elsevier.com), can select from many different types of additives for inclusion into the compounds of the present invention.

Non-limiting examples of additives or oligomers are adhesion promoters; antioxidants; biocides (antibacterials, fungicides, and mildewcides), anti-fogging agents; anti-static agents; bonding, blowing and foaming agents; dispersants; fillers and extenders; smoke suppressants; expandable char formers; impact modifiers; initiators; nucleators; acid neutralizers; lubricants; micas; pigments, colorants and dyes; plasticizers; processing aids; other polymers; release agents; silanes, titanates and zirconates; additional slip agents; anti-blocking agents; stabilizers; stearates; ultraviolet light absorbers; viscosity regulators; waxes; and combinations thereof. The low-haze films of the present invention typically further comprise at least one of the following additives or oligomers: nucleators, antioxidants, acid neutralizers, slip agents, antiblock agents, antifogging agents, and pigments.

Antiblock additives are often used together with slip additives and for their complementary functions. Anti-block additives reduce adhesion or the "stickiness" between polymer layers (usually layers of the same polymer), which is created by blocking forces inherent to many polymers. Whereas slip additives decrease friction caused from moving across the surface of a polymer, antiblock additives create a microrough surface that lessens the adhesion caused by these blocking forces. Antiblock additives, like slip additives, are commonly used to improve the handling of a polymer for applications such as packaging. For instance, a non-migratory antiblock additive, such as crosslinked poly(methyl methacrylate) or inorganic silica, can be used.

Another aspect of the invention relates to a packaging composition comprising the low-haze film of the invention. The low-haze film of the present invention may be used in a variety of packaging applications, including packaging rolls, packaging bags, caps, pouches, sheets, trays, carton liners, wrappers, screen printing films, lamination film, labels, adhesives, stretch and shrink wraps, and photographic materials.

Another aspect of the invention relates to a plastic composition comprising the low-haze film of the invention. The low-haze film of the present invention may be used in a variety of plastic compositions, including stretch films for primary packaging and unitization, and films for heat sealing and printing applications.

Another aspect of the invention relates to a method for preparing the low-haze film of the invention, comprising polymerizing propylene and ethylene with a non-phthalate Ziegler-Natta catalyst system to form the ethylene/propylene random copolymer composition; and extruding the ethylene/propylene random copolymer composition to form the film.

Various Ziegler-Natta procatalyst known in the art may be used in the non-phthalate catalyst system, although other catalyst systems known in the art for polymerizing propylene and ethylene may be used, as well. For instance, the Ziegler-Natta procatalyst composition typically contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof. In a typical Ziegler-Natta procatalyst composition, the transition metal is titanium, the Group 2 metal is magnesium, and the halogen is chloride.

The transition metal compound may have the general formulas of $TrX_x$ or $Tr(OQ)_g X_{4-g}$. Tr is the transition metal, for instance, Tr may be a Group 4, 5, or 6 metal. In one embodiment, Tr is a Group 4 metal, such as titanium. In another embodiment, Tr is Group 5 metal, such as vanadium. Each Q independently represents a hydrocarbon group, such as a $C_1$-$C_{10}$ alkyl group. X represents a halogen atom, such as chloride, bromide, or iodide; x is an integer from 3 to 4; and g is an integer from 0 to 4. Exemplary transition metal compounds include, but are not limited to, titanium trihalides such as $TiCl_3$, $TiBr_3$, and $TiI_3$; titanium tetrahalides such as TiCl$_4$, TiBr$_4$, and TiI$_4$; alkoxytitanium trihalides such as Ti(OCH$_3$)Cl$_3$, Ti(OC$_2$H$_5$)Cl$_3$, Ti(OC$_4$H$_9$)Cl$_3$, Ti(OC$_2$H$_5$)Br$_3$, and Ti(OC$_4$H$_9$)Br$_3$; dialkoxytitanium dihalides such as Ti(OCH$_3$)$_2$Cl$_2$, Ti(OC$_2$H$_5$)$_2$Cl$_2$, Ti(OC$_4$H$_9$)$_2$Cl$_2$ and Ti(OC$_2$H$_5$)$_2$Br$_2$; trialkoxytitanium monohalides such as Ti(OCH$_3$)$_3$Cl, Ti(OC$_2$H$_5$)$_3$Cl, Ti(OC$_4$H$_9$)$_3$Cl, and Ti(OC$_2$H$_5$)$_3$Br; and tetraalkoxytitaniums such as Ti(OCH$_3$)$_4$, Ti(OC$_2$H$_5$)$_4$ and Ti(OC$_4$H$_9$)$_4$. Mixtures of two or more such transition metal compounds may be used as well. The transition metal compound may be used individually or in solutions of hydrocarbon compounds or halogenated hydrocarbons.

Suitable Group 2 metal compounds include, but are not limited to, magnesium halides, such as magnesium chloride and magnesium bromide; alkoxymagnesiums, such as ethoxymagnesium, isopropoxymagnesium, butoxymagnesium, and 2-ethylhexoxymagnesium; dialkoxymagnesiums, such as diethoxymagnesium; alkoxymagnesium halides, such as methoxymagnesium chloride, ethoxymagnesium chloride, isopropoxy magnesium chloride, butoxy magnesium chloride, and octoxy magnesium chloride; magnesium oxyhalides; dialkylmagnesiums; aryloxymagnesiums, such as phenoxymagnesium and methylphenoxy magnesium chloride; and carboxylates of magnesium, such as magnesium laurate and magnesium stearate. These magnesium compounds may be in the liquid or solid state. Typically, the Group 2 metal compound is magnesium dichloride.

The Ziegler-Natta procatalyst composition may include an internal electron donor. Suitable internal electron donors include, but are not limited to, diethers, diesters, cyclic diesters, and succinates, and combinations thereof. The non-phthalate catalyst system may also include one or more external electron donor compounds.

The polymerization process comprises polymerizing ethylene and propylene in the presence of the non-phthalate catalyst system under reaction conditions known by one skilled in the art sufficient to form the ethylene/propylene random copolymer. The non-phthalate catalyst system may be any non-phthalate catalyst system described herein.

Any kind of polymerization process suitable for preparing a polyolefin can be used with the non-phthalate catalyst system. The polymerization can be carried out, for example, in bulk phase using a liquid monomer (e.g., propylene) as a reaction medium, in slurry using an inert liquid (e.g., hydrocarbon) as a diluent, in solution using either monomers or inert hydrocarbons as solvent for the nascent polymer, or in gas phase, operating in one or more fluidized or mechanically agitated bed reactors.

When forming the film, the ethylene/propylene copolymer composition is extruded into a film by means known in the art using an extruder or other apparatus. The term "extruder" takes on its broadest meaning and, includes any machine suitable for polyolefin extrusion. For instance, the term includes machines that can extrude polyolefin in the form of powder or pellets, sheets, fibers, or other desired shapes and/or profiles. Generally, an extruder operates by feeding material through the feed throat (an opening near the rear of the barrel) which comes into contact with one or more screws. The rotating screw(s) forces the polyolefin forward into one or more heated barrels (e.g., there may be one screw per barrel). In many processes, a heating profile can be set for the barrel in which three or more independent proportional-integral-derivative controller (PID)-controlled heater zones can gradually increase the temperature of the barrel from the rear (where the plastic enters) to the front. The vessel can be, for instance, a single-screw or a twin-screw extruder, or a batch mixer. Further descriptions about extruders and processes for extrusion can be found in U.S. Pat. Nos. 4,814,135; 4,857,600; 5,076,988; and 5,153,382; all of which are incorporated herein by reference.

When a melt extrusion is used, the reaction can take place during the melt extrusion step. The heat produced during the extrusion step provides the energy necessary for the reactions between different reaction components. A temperature at or above the decomposition temperature of the free radical initiator may be maintained for a time sufficient to result in decomposition of the free radical initiator. For instance, the residence time may be at least 5 seconds, at least 10 seconds, or at least 15 seconds. Typically, the reaction time is 15-90 seconds. Another aspect of the invention relates to the copolymer composition, described above, that can be used in the film. In particular, this aspect of the invention relates to an ethylene/propylene random copolymer composition comprising about 3.5-10 wt % ethylene content and about 90-96.5 wt % propylene content, for production of a low-haze film having a percentage haze, measured on a film of 2 mil thickness after 96 hours of annealing at 50° C., that satisfies one of the following two criteria:

i) when the value calculated as is $$\frac{C_2 X_{n,2i}}{r_1 r_2 mmmm}$$

about 0.002 or less, the percentage haze value is no more than about 3.3%; or ii) when the value calculated as $$\frac{C_2 X_{n,2i}}{r_1 r_2 mmmm}$$

is greater than about 0.002, the percentage haze value falls below the linear curve generated from the following equation:

$$\% \text{ Haze} = a\left(\frac{C_2 X_{n,2i}}{r_1 r_2 mmmm}\right) + b,$$

where a is 3403.74 and b is 1.27, −0.38, or −3.68;
wherein $C_2$ is the ethylene weight percent of the total polymer, $X_{n,2i}$ is the Regio error of the hexane extract, $r_1 r_2$ is the Blockiness Index of hexane extract, and mmmm is the Meso-pentad of the hexane extract.

Additional aspects, advantages and features of the invention are set forth in this specification, and in part will become apparent to those skilled in the art on examination of the following, or may be learned by practice of the invention. The inventions disclosed in this application are not limited to any particular set of or combination of aspects, advantages and features. It is contemplated that various combinations of the stated aspects, advantages and features make up the inventions disclosed in this application.

EXAMPLES

The following examples are given as particular embodiments of the invention and to demonstrate the practice and advantages thereof. It is to be understood that the examples are given by way of illustration and are not intended to limit the specification or the claims that follow in any manner.

Experimental

Migration test: High ethylene random copolymer films typically result in higher amount of migration leading to blooming, transfer line build up and several other processing disadvantages and restrictions in food and medical packaging applications. Herein, migration was quantitatively measured following an accelerated testing approach in which a 2 mil film was prepared and conditioned in an environmental chamber at 50° C. for 96 hours. This was done to accelerate the migration of oligomers and additives to the surface of the film. After the 96 hour annealing at 50° C., the film is removed from the environmental chamber, cooled to room temperature and % haze is measured using a Gardner Haze-Guard Plus apparatus. This value is being reported as % haze (96 hrs, 50° C.) and utilized in this application as a measure of migration.

Hexane extraction: 10 ml hexane was added to 5 g of ethylene/propylene copolymer pellets in a glass vial and sonicated for 4 hours. Following this, the glass vial along with its contents was cooled to room temperature by allowing it to sit and the clear solution decanted. This decanted clear solution was then evaporated overnight at room temperature to obtain the hexane extract.

Ethylene weight percent: Ethylene weight percent of the total polymer was determined using a Nicolet 6700 FT-IR.

Regio error of the hexane extract: Hexane was used for extracting components that have good regio error peak visibility. Regio error of the hexane extract was determined by using $^{13}C$ NMR spectroscopy and calculating the total number fraction of even methylene sequences, in accordance with Wang W. et al., *Macromolecules*, Vol. 33, No. 4, 2000, which is incorporated herein by reference in its entirety.

Blockiness index of the hexane extract: Blockiness Index of the hexane extract was determined using $^{13}C$ NMR spectroscopy in accordance with Kakugo et al., *Macromolecules* 15, 1150-1152, 1982, which is incorporated herein by reference in its entirety.

Meso-pentad of the hexane extract: Meso-pentad of the hexane extract was determined using $^{13}C$ NMR spectroscopy.

Haze test: Haze was measured on a 2 mil cast film after 96 hours of annealing at 50° C. using a Gardner Haze-Guard Plus apparatus.

Film Extrusion: The film was extruded using a TEACH-LINE Extruder E 20 T having the following settings:

| Extruder Temperature in ° C. | | | | | | | |
|---|---|---|---|---|---|---|---|
| Zone: | | | | | | | |
| | 1 | 2 | 3 | 4 | 5 | 6 | 7 |
| Set Temp: | 50 | 190 | 210 | 210 | 210 | 210 | 210 |
| Actual: | 50 | 191 | 211 | 211 | 210 | 210 | 210 |

| Extruder RPM | 40 |
|---|---|
| Amperage (%): | 1.7 |
| Pressure (bar): | 50 |
| Melt Temp (° c.): | 195 |

| Die/Feedblock Temperature in ° C. | | | | | |
|---|---|---|---|---|---|
| Zone: | | | | | |
| | 1 | 2 | 3 | 4 | 5 |
| Set Temp: | 210 | 210 | 210 | 210 | 210 |
| Actual: | 207 | 207 | 210 | 209 | 210 |

| | speed (m/min) |
|---|---|
| Chill Roll: | 1.1 |
| Take Off Roll: | 1.3 |
| Winder: | 59% |
| Blower: | Off |

| | mil | mm |
|---|---|---|
| DIE GAP: | 10 | |
| FILM THICKNESS: | 2 | |
| LAYER STRUCTURE: | Monolayer | |
| EDGE TRIM (Y/N): | No | |

Examples 1-6 and Comparative Example

In these examples, ethylene/propylene pellets of Samples 1-6 and the Comparative Sample were extruded into a 2 mil monolayer film using a TEACH-LINE Extruder E 20 T at 40 rpm screw speed with the following zone temperatures: Zone 1: 30° C., Zone 2: 190° C., Zone 3-7: 210° C., Die: 210° C. Following extrusion, the films were conditioned in an environmental chamber at 50° C. for 96 hours. This was done to accelerate the migration of oligomers to the surface of the film. After 96 hour annealing at 50° C., the film was removed from the environmental chamber and cooled to room temperature. The % Haze was measured using a Gardner Haze-Guard Plus. This value was reported as % Haze (96 hrs, 50° C.) and utilized in this study as a measure of migration. For compositional analysis, hexane extraction was obtained by dissolving 5 g pellets into a glass vial containing 10 ml hexane and sonicating for 4 hours. Following this, the glass vial, along with its contents, was cooled to room temperature by allowing it to sit, producing a clear solution, which was then decanted. This decanted clear solution was then evaporated overnight at room temperature to obtain the hexane extract. $^{13}C$ NMR was performed on the hexane extract to determine $X_{n,2i}$, $r_1r_2$ and mmmm.

| Example | Haze | Hexane Extract | | | | $X_{n,2i} \cdot C2/$ |
| | | $X_{n,2i}$ | r1r2 | mmmm | C2 | r1r2 · mmmm |
| --- | --- | --- | --- | --- | --- | --- |
| Example 1 | 3.3 | 0.026324 | 2.648042 | 24.30242 | 5.7 | 0.002332 |
| Example 2 | 11 | 0.043596 | 2.8338 | 19.81325 | 5.7 | 0.004426 |
| Example 3 | 17 | 0.047442 | 2.397275 | 17.73344 | 5.7 | 0.006361 |
| Comparative Ex. | 23.6 | 0.040846 | 1.92649 | 19.02686 | 5.7 | 0.006352 |
| Example 4 | 0.42 | 0.011271 | 2.467665 | 40.45175 | 3.7 | 0.000418 |
| Example 5 | 1.93 | 0.00939 | 2.084158 | 37.57836 | 5.7 | 0.000683 |
| Example 6 | 2.6 | 0.012931 | 2.034293 | 34.77249 | 5.7 | 0.001042 |

Seven ethylene/propylene copolymers (Examples 1-6 and the Comparative Example) having various hexane extract values were produced. The copolymers were extruded on a film of 2 mil thickness and their haze values were measured and plotted (FIG. 1). The graph in FIG. 1 shows that Examples 1-6 all fall within the scope of this invention. In Example 1, the value calculated as $$\frac{C_2 X_{n,2i}}{r_1 r_2 mmmm}$$

was about 0.002, and the percent haze value was 3.3%. In Examples 2-3 and the Comparative Example, the value calculated as $$\frac{C_2 X_{n,2i}}{r_1 r_2 mmmm}$$

was greater than 0.002. The percent haze values for Examples 2 and 3 fell below the linear curve generated from the following equation:

$$\% \text{ Haze} = a\left(\frac{C_2 X_{n,2i}}{r_1 r_2 mmmm}\right) + b,$$

where a is 3403.74 and b is 1.27, while the percent haze value for the Comparative Example fell above the linear curve. An additional linear curve is shown in FIG. 1, corresponding to a b value of −0.38. Examples 1-3 fell below this linear curve as well. The bolded line in the graph of FIG. 1 represents a linear curve showing the best fit for Examples 1-3. The best-fit linear curve has a b value of −3.68 in the above equation. In Examples 4-6, the value calculated as $$\frac{C_2 X_{n,2i}}{r_1 r_2 mmmm}$$

was less than 0.002 and the respective percent haze value was less than 3.3%.

I claim:

1. An ethylene/propylene random copolymer composition comprising about 3.5-10 wt % ethylene content and about 90-96.5 wt % propylene content that, when formed into a film, shows low haze, measured on a film of 2 mil thickness after 96 hours of annealing at 50° C., wherein the ethylene/propylene random copolymer composition and the low-haze film, respectively, satisfy one of the following two criteria:
  i) when the value calculated as $$\frac{C_2 X_{n,2i}}{r_1 r_2 mmmm}$$

is about 0.002 or less, the percentage haze value is no more than about 3.3%; or
  ii) when the value calculated as $$\frac{C_2 X_{n,2i}}{r_1 r_2 mmmm}$$

is greater than about 0.002, the percentage haze value falls below the linear curve generated from the following equation:

$$\% \text{ Haze} = a\left(\frac{C_2 X_{n,2i}}{r_1 r_2 mmmm}\right) + b,$$

where a is 3403.74 and b is 1.27;
  wherein $C^2$ is the ethylene weight percent of the total ethylene/propylene random polymer, $X_{n,2i}$ is the Regio error of the hexane extract of the ethylene/propylene random copolymer, $r_1 r_2$ is the Blockiness Index of hexane extract of the ethylene/propylene random copolymer, and mmmm is the Meso-pentad of the hexane extract of the ethylene/propylene random copolymer.

2. The composition of claim 1, wherein the b variable is −0.38.

3. The composition of claim 1, wherein the b variable is −3.68.

4. The composition of claim 1, wherein the ethylene content is about 3.5 wt % to about 7.5 wt %.

5. The composition of claim 1, wherein the ethylene content is about 5 wt % to about 7.5 wt %.

6. The composition of claim 1, wherein the ethylene content is about 3.7 wt %.

7. The composition of claim 1, wherein the ethylene content is about 5.7 wt %.

8. The composition of claim 1, wherein the haze is less than about 20%.

9. The composition of claim 1, further comprising at least one additive or oligomer selected from the group consisting of nucleators, antioxidants, acid neutralizers, slip agents, antiblock agents, antifogging agents, pigments, and combinations thereof.

* * * * *